United States Patent [19]

Satterfield, III et al.

[11] 4,021,022

[45] May 3, 1977

[54] PIGMENT METERING AND MIXING APPARATUS

[75] Inventors: John J. Satterfield, III, Akron, Ohio; Kenneth E. Swain, Hoffman Estates, Ill.

[73] Assignee: Americhem, Inc., Cuyahoga Falls, Ohio

[22] Filed: Aug. 27, 1975

[21] Appl. No.: 608,191

[52] U.S. Cl. .............................. 259/18; 198/761; 259/DIG. 41
[51] Int. Cl.² ................... B01F 5/00; B65G 27/24
[58] Field of Search ............ 259/18, 185, DIG. 31, 259/DIG. 41, DIG. 42; 222/161, 199, 200; 198/220 R, 220 BA, 220 DC, DIG. 5, DIG. 15; 425/130, DIG. 108

[56] References Cited

UNITED STATES PATENTS

| | | | |
|---|---|---|---|
| 1,997,301 | 4/1935 | Kniffen et al. | 259/DIG. 31 |
| 2,323,864 | 7/1943 | Weyandt | 222/199 |
| 2,533,331 | 12/1950 | Skinner | 198/220 R |
| 2,918,590 | 12/1959 | Gilbert | 198/220 DC |
| 3,050,215 | 8/1962 | Williams | 222/161 |
| 3,532,326 | 10/1970 | Schilling et al. | 259/18 |
| 3,814,386 | 6/1974 | Guglietti | 259/DIG. 41 |

*Primary Examiner*—Richard E. Aegerter
*Assistant Examiner*—Richard R. Stearns
*Attorney, Agent, or Firm*—Hamilton, Renner & Kenner

[57] ABSTRACT

Apparatus for continuously metering small amounts of comminuted plastic color pigment or concentrate in desired proportions to a volume of resin being supplied to an extruder. The feed of the color concentrate is accurately metered by a controlled electromagnetic vibrator and delivered into the resin feed throat of the extruder.

5 Claims, 5 Drawing Figures

PIGMENT METERING AND MIXING APPARATUS

BACKGROUND OF THE INVENTION

Prior systems known to us for proportionately blending powdered or granular concentrated color pigment with extruded plastic resin compounds to produce a wide variety of colors and shades have been limited to preblending the color pigment and resin on a batch basis because available metering equipment did not deliver accurately and continuously the required small amounts of color pigment. Moreover, such prior equipment is not capable of accurately regulating the continuous delivery of the required low level amounts, for example, 5 to 10 grams per minute, so as to vary the proportion of color pigment to the amount of resin moving through the extruder.

SUMMARY OF THE INVENTION

The present invention comprises a color concentrate delivery hopper and conduit mounted on an electromagnetic vibrator having its amplitude closely regulated and accurately controlled to provide exact feed rate control of concentrate through the conduit, the conduit delivering color concentrate into the feed throat of an extruder, through which granular uncolored plastic material is continuously delivered in a regulated amount from a storage hopper.

It is an object of the present invention to provide improved apparatus for continuously metering small proportionate amounts of color concentrate into the feed throat of an extruder receiving uncolored plastic resin material.

Another object is to provide accurate control of the metering of color concentrate by providing digital display of the electrical energy delivered to the drive for the metering means.

Another object is to provide a removable storage hopper for supplying color concentrate to the delivery hopper therefor.

A further object is to provide means for adjusting the flow from the storage hopper to the delivery hopper.

A still further object is to provide an improved distributing hood in the feed of the extruder, through which the color concentrate is delivered centrally of the flow of plastic material through the throat.

These and other objects are accomplished by the improvements comprising the present invention, a preferred embodiment of which is shown by way of example in the accompanying drawings and described herein. Various modifications and changes in details of construction are comprehended within the scope of the appended claims.

DESCRIPTION OF A PREFERRED EMBODIMENT

Figure 1:
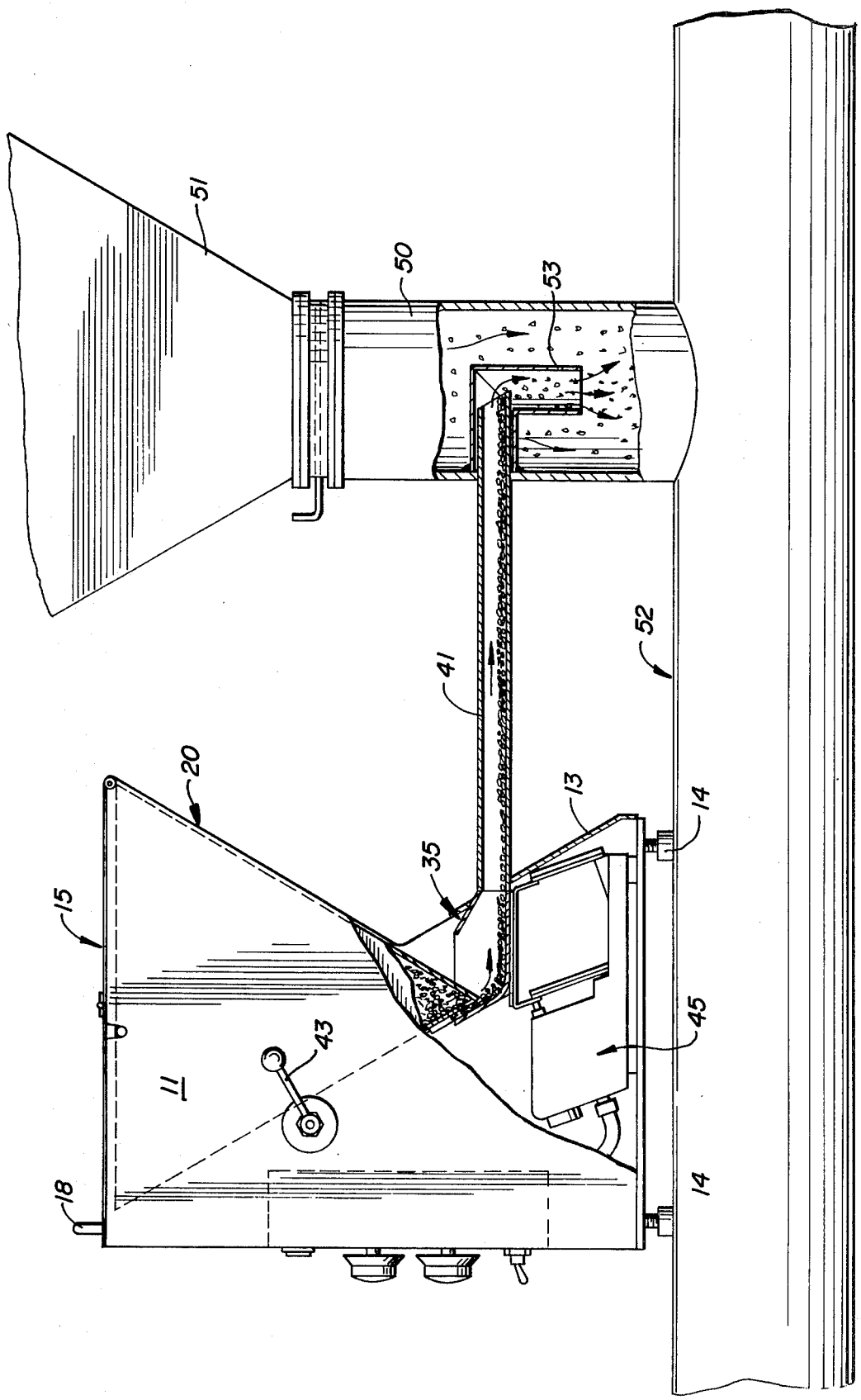
FIG. 1 is a side elevation, partly broken away and in section, of a preferred embodiment of the improved apparatus comprising the invention.

The improved apparatus includes a housing having a vertical front wall 10, side walls 11 extending rearwardly therefrom, a bottom wall 12, and a forwardly inclined rear wall 13 extending upwardly from the rear edge of the bottom wall 12. The bottom wall 12 is preferably provided with leveling screws 14 for supporting the housing on a table or other supporting surface. The top of the housing is provided with a cover 15 which is hinged at 16 on the rear upper corners of side walls 11 and the cover preferably comprises front and rear parts 15a and 15b hinged together at 17, a handle 18 being provided on the front of part 15a.

Figure 5:
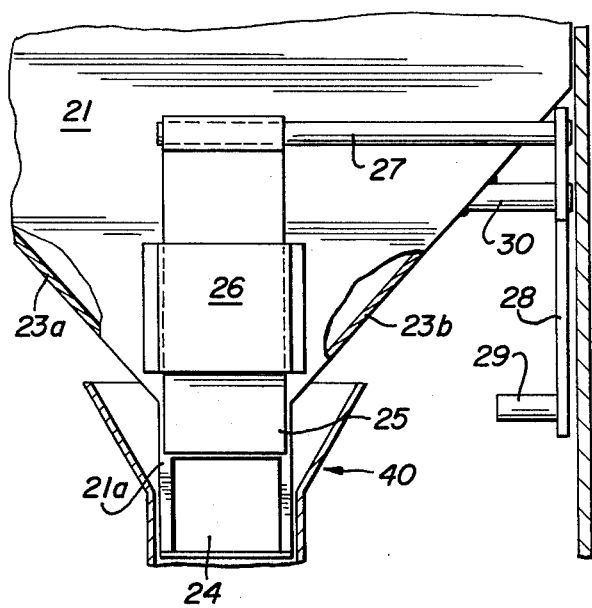
FIG. 5 is a partial elevational view on line 5—5 of FIG. 4.
Figure 3:
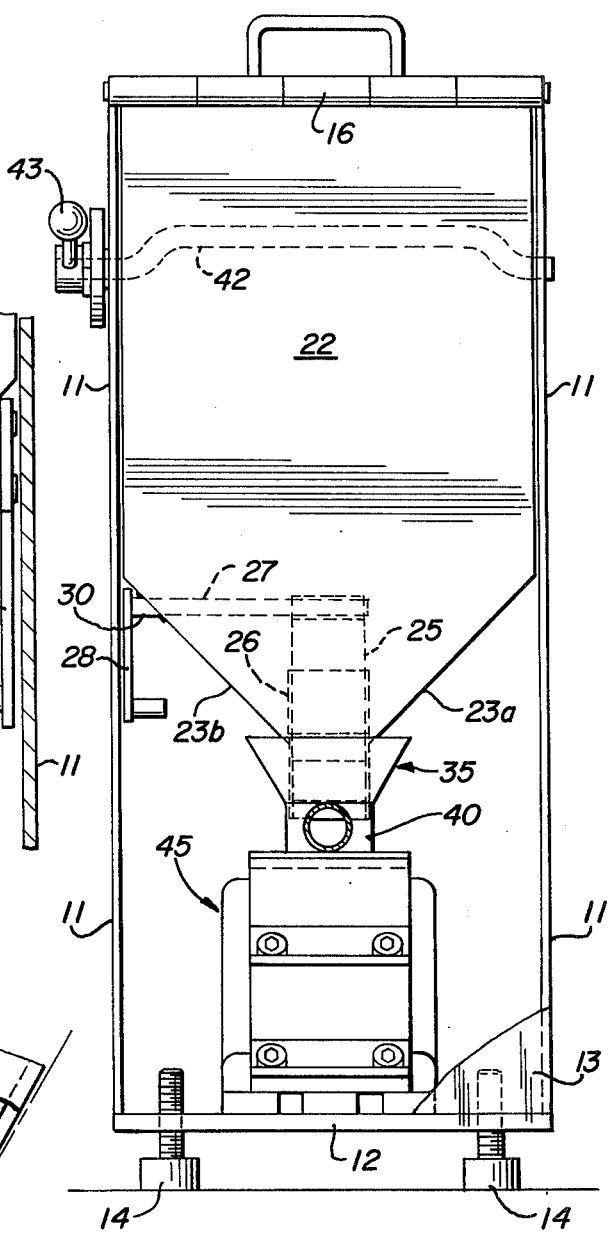
FIG. 3 is an elevational view, partly in section, on line 3—3 of FIG. 2.

A storage hopper for plastic color concentrate in granular or comminuted condition is indicated generally at 20 and preferably has downwardly inwardly inclined front and rear walls 21 and 22, respectively, connected to vertical side walls 23. As shown in FIGS. 3 and 5, the lower portions 23a and 23b of side walls 23 are inwardly inclined and terminate in rectangular neck portions 21a and 22a formed on the lower ends of the front and rear walls 21 and 22, respectively, of the hopper 20. The neck portions 21a and 22a intersect at the bottom of the hopper and a rectangular opening 24 is provided in portion 21a adjoining the intersection.

A rectangular slide cover 25 for the opening 24 is slidably mounted in a guide bracket 26 secured to front wall 21, and has a laterally extending operating rod 27 attached to its upper end. The outer end of rod 27 has a pin and slot connection with one end of a bell crank lever 28 having a handle 29 on its other end, and the intermediate portion of lever 28 is journaled on a pivot post 30 secured to inclined hopper wall 23b.

Figure 2:
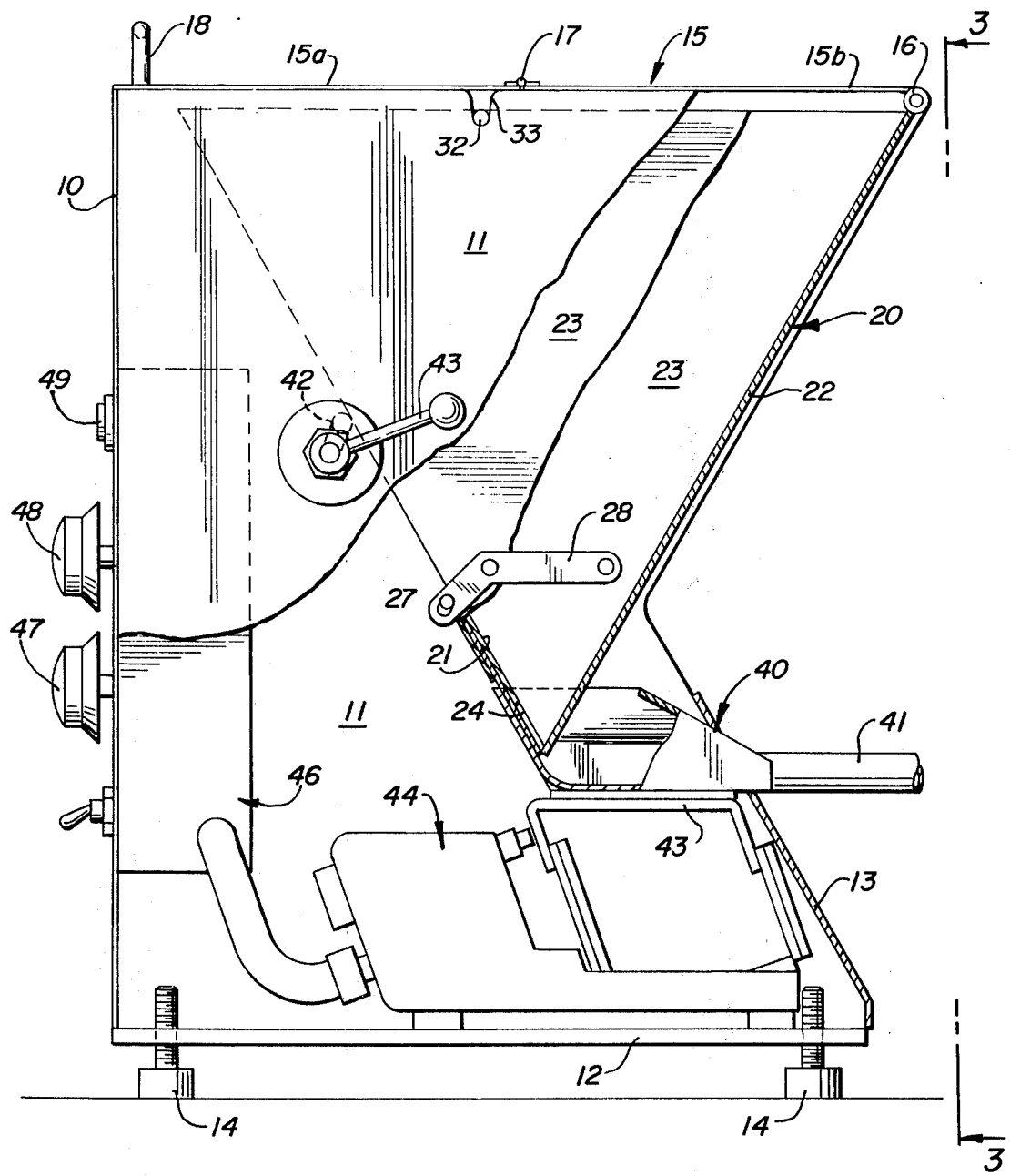
FIG. 2 is an enlarged partial view thereof.

The side walls 23 of the hopper have support pins 32 extending laterally from their upper edges and received in notches 33 in the upper edges of the housing side walls 11 for removably supporting the hopper in the housing. If it is desired to replace the hopper 20 containing one color concentrate with another hopper 20 containing a different color concentrate, the lever 28 is moved to the position of FIG. 2 to close the opening 24 and the cover 15 opened, whereupon the hopper and its contents may be bodily removed.

Figure 4:
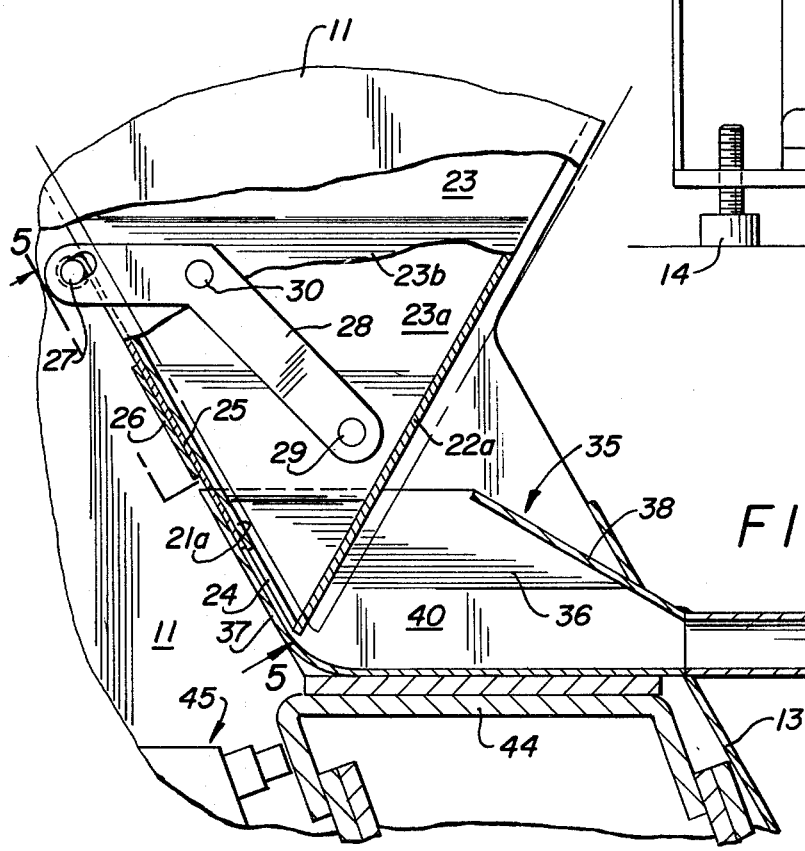
FIG. 4 is an enlarged partial sectional view, similar to FIG. 2, showing the bottom of the color concentrate storage hopper positioned within the delivery hopper.

As best shown in FIG. 4, when the hopper 20 is supported within the housing, the bottom end of the hopper including the outlet opening 24 is received into the upper end of a delivery hopper 35 formed by outwardly flared upper side walls 36 and inclined front wall 37, and inwardly inclined front wall 38. These walls all terminate at their lower ends in a closed rectangular box portion indicated at 40, and the rear end of the box portion is connected to one end of a delivery conduit 41.

When the outlet opening is open as shown in FIG. 4, the position of the storage hopper 20 is adjustable to vary the flow of color concentrate into the delivery hopper to insure adequate supply therein by swinging hopper 20 on support pins 32 to move the outlet opening 24 away from front wall 37 of the delivery hopper as indicated in phantom lines. This is accomplished by a cam 42 rotatably mounted in the walls 11 of the housing and abutting the front wall of the storage hopper. A handle 43 is provided to rotate the cam.

The bottom of the box portion 40 of the delivery hopper 35 is secured, as by welding, to the top plate 44 of the armature or vibratory plate of an electromagnetic vibrator indicated as a whole at 45 and supported on the bottom wall 12 of the housing. When the vibrator 45 is energized the color concentrate in the delivery hopper is conveyed at a controlled rate through the conduit 41. We have had satisfactory results using a 60 cycle, 115 volt vibratory feeder manufactured by Syntron Corp. of Homer City, Pennsylvania.

The vibrator 45 is electrically connected to a 110 volt power supply (not shown) in series with an SCR power controller indicated generally at 46. Preferably, this controller is a voltage regulator manufactured by Lutron Corp. of Coopersburg, Pennsylvania, and is identified as a PDV Power Dial Voltage Regulator. The controller is mounted on the front wall 10 of the housing and has coarse and fine adjustment knobs 47 and 48, respectively, for regulating the voltage going to the vibrator. The coarse adjustment knob 47 varies the voltage over the entire range and the fine adjustment knob 48 is connected in series with a rheostat (not shown) to control voltage over a narrow range. A digital indicator dial 49 connected to a volt meter (not shown) which is connected across the line shows the amount of energy actually being delivered to the vibrator. We have had satisfactory results using a TA-300-05 Digital Panel Meter manufactured by Tekelec, Inc. of Oxnard, California, modified to show a range of numbers directly related to the energy supplied.

The outer of rear end of delivery conduit 41 is inserted into the supply conduit or throat 50 of an extruder in which uncolored plastic resin is being worked and extruded. The throat 50 connects a supply hopper 51 containing granular or comminuted plastic resin to an extruder indicated generally at 52. Preferably, the end of delivery conduit 41 is inserted into an elbow-shaped tube or hood 53 which opens downwardly within the medial portion of throat 50 so that the incoming particles of color concentrate will be distributed substantially uniformly within the stream of uncolored resin particles going to the extruder.

In the operation of the improved apparatus, the flow of color concentrate into the extruder throat is accurately controlled by controlling the amplitude of vibration of the vibrator 45 so as to deliver color concentrate continuously in the desired proportion of the resin moving to and through the extruder. The visual indication of voltage applied to the vibrator at dial 49 enables regulating the flow of color concentrate with exactitude, especially at very low levels of the order of 5 to 10 grams per minute. Obviously, the flow rate of color concentrate can be quickly and accurately changed to various proportions of the resin as desired. The proportioning of color concentrate is continuously carried out, thus avoiding the necessity of premixing color concentrate and resin on a batch basis.

Moreover a number of storage hoppers 20 loaded with different color concentrates can be kept on hand to quickly replace the one in use at any time it is desired to produce a different colored product from the extruder.

We claim:

1. In combination, a vertical supply throat for supplying granular or comminuted plastic resin to an extruder, apparatus for metering a controlled amount of granular or comminuted color concentrated into said throat, comprising a color concentrate storage hopper having an opening near the bottom thereof, an electromagnetic vibrator having a vibratable plate, a color concentrate delivery hopper mounted on said plate and having an upper open end surrounding the bottom of said storage hopper and defined in part by an inclined wall, said storage hopper opening facing toward said wall so that said wall receives the color concentrate from said storage hopper, means to swing said storage hopper to move said opening therein toward and away from said wall to control flow into said delivery hopper, a delivery conduit connected to said delivery hopper for vibrating therewith and having its delivery end extending laterally into said throat, and means for accurately controlling the voltage supply to the vibrator to regulate the amplitude of the vibrator.

2. Apparatus as described in claim 1, wherein said storage hopper is removably mounted over said delivery hopper.

3. Apparatus as described in claim 2, further comprising a closure slide for closing said opening in said storage hopper.

4. Apparatus as described in claim 1, wherein the means for accurately controlling the voltage supply to the vibrator includes a digital indicator dial showing the amount of energy actually being delivered to the vibrator.

5. Apparatus as described in claim 1, further comprising a distributor hood mounted over the delivery end of said conduit within said throat for discharging the color concentrate downward centrally of said throat.

* * * * *